UNITED STATES PATENT OFFICE.

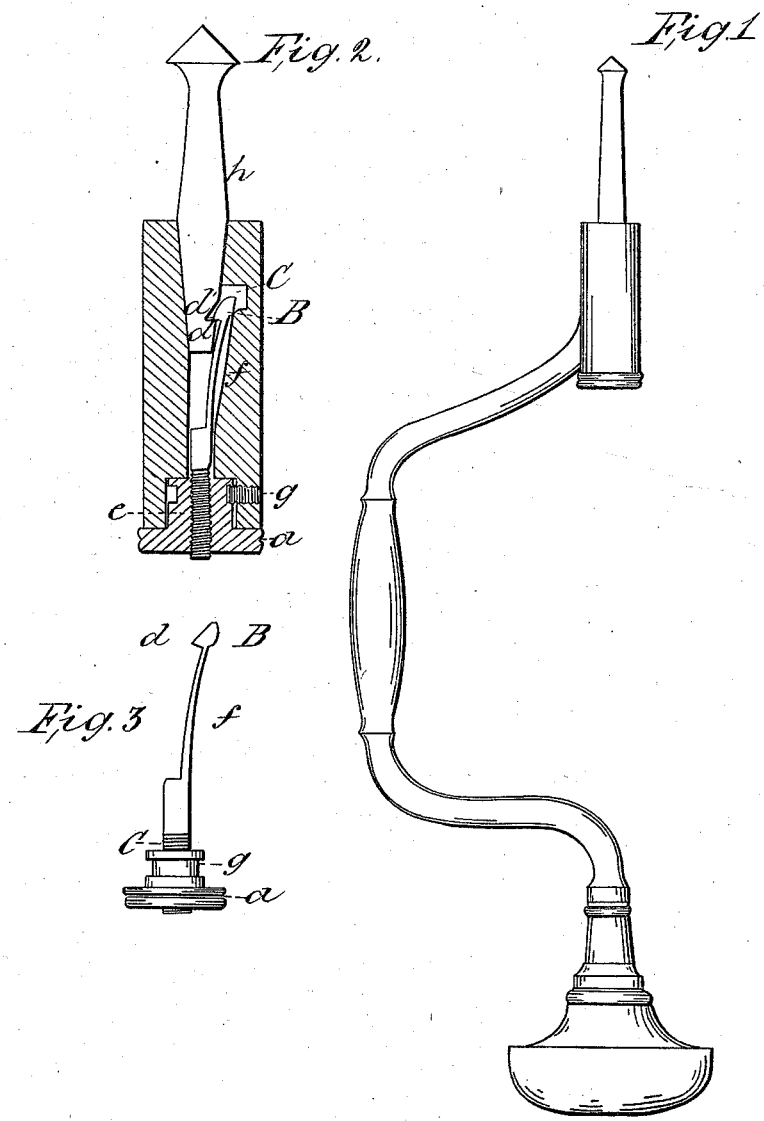

EBENR. W. NICHOLS, OF WORCESTER, MASSACHUSETTS.

MODE OF SECURING BRACE-BITS IN THEIR SOCKETS.

Specification of Letters Patent No. 12,868, dated May 15, 1855.

*To all whom it may concern:*

Be it known that I, EBENEZER W. NICHOLS, of Worcester, in the county of Worcester and State of Massachusetts, have invented a new and Improved Mode of Fastening Auger or other Bits to Their Socket; and I do hereby declare that the following is a full, clear, and exact description of the same, reference being had to the annexed drawings, making a part of this specification, in which—

Figure 1 is a side view of a bit-stock constructed in the ordinary manner with this single exception—viz the bur nut as seen at letter *a*. Fig. 2 is a half section of that part of the bit stock in which the shank of the bit is fastened. Fig. 3 is a detached view of the bur nut and steel spring.

Similar letters of reference indicate corresponding parts in the several figures.

The nature of my invention consists in the peculiar method of fastening the shank of the auger or other kind of bit into the socket of the bit-stock so that the act of boring or drawing the auger from the hole bored shall have no tendency to loosen the said shank as will be hereafter fully shown and described whereby the auger may be fastened in its place or detached therefrom with the greatest facility desired—and when adjusted in its position—very little strain comes upon the fastening of the auger.

To enable others skilled in the art to fully understand the use of my invention I will proceed to describe it.

Fig. 2 is a half section of that part of the bit-stock which holds the auger (or bit) *h*, in which an appropriate opening is made by a sand core when the bit-stock is cast, (the most of which are made of malleable iron.) Said opening extends through Fig. 2 and is of suitable form to receive the bit *h* by the side of which and about three-fourths of an inch from the end of the taper opening is a recess *c* against which is a notch *d* in the bit *h*.

Into the notch *d* fits a corresponding projection *d'* which is brought into its place by means of the bur nut *a*. To loosen the bit *h* I unscrew the nut *a* and the projection B springs back into the recess *c* by the spring *f*.

In Fig. 3 may be seen the spring *f* upon one end the projections B and *d*—upon the other end I cut a screw *e* and a corresponding thread in the bur nut *a*—in said nut I turn a groove *g* (Fig. 3) into which I place the set screw *g* (Fig. 2) which holds the nut stationary endwise and adjusts the projections B—*d* as desired to both fasten and unfasten the bit *h*.

I do not claim the projections B,—*d* upon the spring *f*; but

What I do claim and desire to secure by Letters Patent is—

The bur-nut *a* (or its equivalent) in combination with the spring *f* operating upon the wedge principle (by the use of the screw) the projections B—*d* for the purpose and in the manner herein described.

EBENEZER W. NICHOLS.

Witnesses:
AMOS LYON,
WM. H. BOYDEN.